United States Patent
Voges

[15] 3,678,620
[45] July 25, 1972

[54] PACKAGE

[72] Inventor: Albert John Voges, Leidsestraat 83, Hillegon, Netherlands

[22] Filed: June 23, 1970

[21] Appl. No.: 49,043

[30] Foreign Application Priority Data

April 3, 1970 Netherlands..........................7004806

[52] U.S. Cl..................................47/37, 47/34.11, 229/28, 229/43, 206/46 PL
[51] Int. Cl..........................................A01g 9/02
[58] Field of Search ................47/34, 34.11, 37, 56; 229/2.5, 229/18 M, 28, 43, 15, 24; 206/46 PL, 78 B; D9/192, 184, 7

[56] References Cited

UNITED STATES PATENTS

| | | | |
|---|---|---|---|
| 3,355,084 | 11/1967 | Donovan | 229/2.5 X |
| 2,930,162 | 3/1960 | Mulford | 47/37 |
| 1,959,510 | 5/1934 | Van Waveren | 47/3411 |
| 2,293,531 | 8/1942 | Brooks | 47/37 |
| 2,945,323 | 7/1960 | Pratt | 47/37 |
| 3,112,577 | 12/1963 | Burger | 47/37 |

Primary Examiner—Robert E. Bagwill
Attorney—Walter Becker

[57] ABSTRACT

A package of plastics material adapted to hold a number of bulbs or tubers arranged at a certain interspace and suitable to be placed integrally the soil for planting said bulbs or tubers. The package comprises a top opening and a bottom opening for the growing stalk and roots, respectively.

5 Claims, 4 Drawing Figures

Patented July 25, 1972
3,678,620
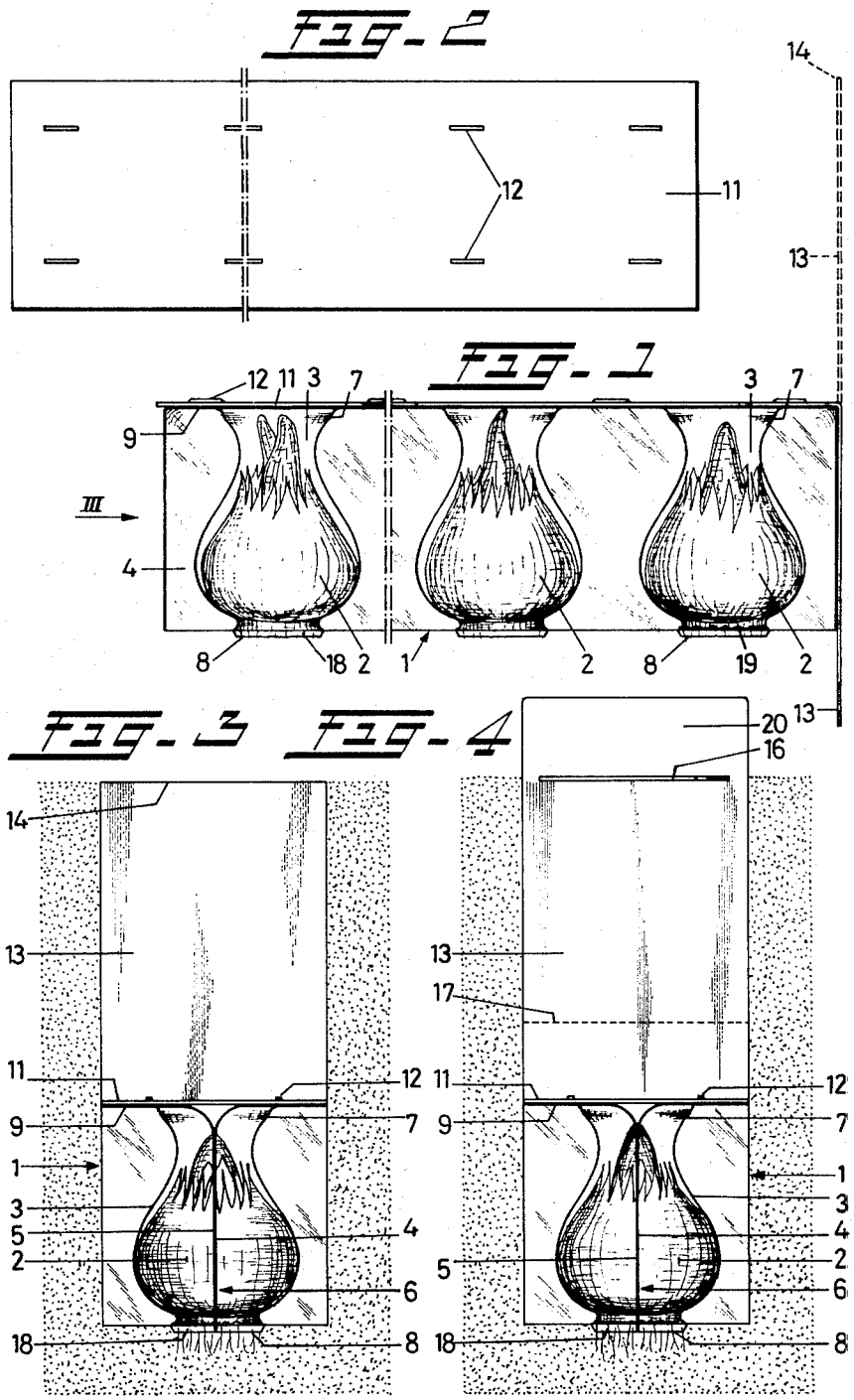
INVENTOR.
Albert John Voges
BY

PACKAGE

The invention relates to a package for bulbs or tubers in which a number of bulbs are packed for transport and in which they are delivered to the user.

A known package therefor is a normal paper bag, out of which the user takes the bulbs for planting same. Then, he digs a small hole for each bulb, which hole is filled again with soil after the bulb has been put therein.

A drawback of this course of affairs is that the planter must be very well informed of the correct way of planting, notably of the requirement with regard to the minimum spacing of the bulbs planted, while attentiveness is required to place the bulb in the correct position, namely in such a manner that the root side is indeed placed downwards. The object of the invention is to meet this drawback by packing in a package according to the invention a number of bulbs or tubers arranged at a certain interspace which corresponds with the correct spacing at which the bulbs should be planted from each other, which package is suitable to be placed, together with the packed bulbs, in the soil for planting same, while the bulbs are kept in the correct position for planting, which package comprises first means for allowing the roots of the growing bulb to emerge, and second means for allowing the growing stalk to emerge upwardly, According to a preferred embodiment, the package is provided with third means indicating the correct depth at which the bulbs should be planted in the soil.

The above new package enables the user to plant the bulbs in an easy manner, without studying prescriptions and information belonging to the bulb type which he is going to plant in a manner which is most favorable for the growth. If, for instance, the package contains six bulbs placed in a row, the planter digs a furrow of sufficient length and depth to lower the package therein up to the correct depth, after which the furrow is filled up with soil. The package may be manufactured to advantage at least partly of a deformable plastic foil, which forms an envelopment for each bulb, which plastic foil protects the bulb from attack in the soil by mouse or worm. Furthermore, by manufacturing the top side of the package of a rigid sheet which in plan view extends to beyond the bulbs, the bulbs can be protected from animals grubbing and scratching in the soil, such as dogs and birds. This sheet may also serve to print pictures, texts communicating the nature of the packed bulb, as well as texts advertising related articles. The rigid sheet, which may for example consist of cardboard, may be provided with a hinged lip which, when its free end is upwardly directed, directly indicates the depth at which the package must be placed in the furrow by means of the top edge of the lip, or a marking line provided on the lip, which must be levelled with the surface of the soil.

To explain the invention, a number of embodiments will be described with reference to the drawing, while some further particulars will be set forth.

FIG. 1 is a side elevational view of a package according to the invention;

FIG. 2 is a plan view thereof;

FIG. 3 is a front elevational view according to the arrow III in FIG. 1;

FIG. 4 is a front elevational view as shown in FIG. 3, but of a different embodiment.

The drawing shows a package 1 containing six bulbs 2. The bulbs 2 are located in recesses 3, which surround the bulb 2 with moderate clearance, and which are formed of two web halves 4 and 5 meeting each other in the plane of drawing of FIG. 1, wherein in each web half, half the recess form is made, for instance by means of vacuum moulding. The web halves 4, 5 may be connected by a longitudinal fold 6, so that the half-recesses can be made in both web halves simultaneously in a blank of the plastic foil, after which the recesses 3 are formed by folding the web halves around the longitudinal fold 6. Preferably a transparent plastic is chosen for the foil, so that the bulbs are visible and capable of being checked by the buyer. The recesses 3 have a top opening 7 and a bottom opening 8, while a flange 9 is formed on the top side of each web half. When the web halves are folded, the flanges 9 form together an upper face, which can be attached to a rectangular strip 11, for example of cardboard. This attachment can be effected in any suitable manner, for example by means of stapels 12, or by glueing, or by means of a heat-seal. The package is now closed and ready for sale.

The package is preferably provided with a lip 13, which can be directed upwardly by the planter during planting, the lip directly indicating the depth at which the bulbs with the package must be placed in the soil, by levelling either the tip edge 14, or the marking 16 (FIG. 4) with the surface of the soil. In the latter case the part 20 of the lip above the marking 16, which part 20 will remain above the soil, may state the type and color of the bulb, or of the flower. To this end, the lip 13 is constructed in rotproof and weather-resistant fashion, at least over a part located for example above the dotted line 17.

When the strip 13 is made of cardboard, it is not necessary to make an access therein above the top opening 7 of the recesses 3 to render emerging of the stalk possible, as either the stalk penetrates through the cardboard, of the cardboard has in good time been rotten away in the soil. By selecting the material of the foil for the web halves 4, 5 from a non-rotting material the bulbs are protected during growth from attack by mice, worms and other animals. Furthermore it has appeared that by providing the lower opening 8 with a depending sharp edge 18 mice cannot get access to the bulb either from the bottom side by gnawing.

The strip 13 may be so wide that animals such as dogs and birds, which dig in the soil to get access to the bulb, stop digging when they have come to the strip 13.

The package according to the invention further provides the possibility of including a layer of root disinfecting substance 19 in the package at the lower opening 8.

I claim:

1. A package for a plurality of bulbs or tubers adapted to be planted bodily in the soil in which a number of bulbs or tubers is packed at interspaces which correspond with the correct spacing at which the bulbs should be planted from each other, which package defines a packing that is suitable to be placed, together with the packed bulbs, in the soil for planting the same, while the bulbs are kept in the correct position for planting, which packing comprises: at least one pair of opposing walls of water-resistant plastic foil interconnected by a longitudinal fold, said walls having pair-wise opposed depressions which together form an envelope holding a bulb or tuber and enclosing the same at least substantially completely with some clearance, each envelope having first means at least partly defining an opening at the bottom of the enclosed bulb to allow the roots of the growing bulb to emerge and second means at least partly defining an opening at the top of the enclosed bulb to allow the growing stalk to emerge upwardly, and the lower portions of said depressions providing support means whereby each bulb is intermediate said first and second means entirely surrounded to give support of the bulb on surfaces of the envelope having approximately the same curvature as that of the bulb, the envelopes being spaced apart a distance corresponding to the correct distance at which the bulbs should be planted in the earth by means of a series of vertically extending spacer elements, said envelopes and spacer elements being secured to each other by means of a transversely extending protective strip overlying said envelope.

2. A package according to claim 1, and further including a depth indicating means secured to said package and extending vertically therefrom a predetermined distance to indicate the correct planting depth.

3. A package according to claim 2, wherein said depth indicating means is comprised of water resistant plastic and bears indicia.

4. A package according to claim 1, wherein said protective strip is comprised of a material which rots sufficiently to permit penetration thereof by the stalk from the growing bulb.

5. A package according to claim 1, and wherein a portion thereof is treated with a disinfectant.

* * * * *